(12) United States Patent
Jeon et al.

(10) Patent No.: US 7,960,941 B2
(45) Date of Patent: Jun. 14, 2011

(54) BATTERY MODULE

(75) Inventors: Yoon-Cheol Jeon, Suwon-si (KR);
Tae-Yong Kim, Suwon-si (KR);
Sang-Won Byun, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 684 days.

(21) Appl. No.: 11/808,422

(22) Filed: Jun. 8, 2007

(65) Prior Publication Data

US 2007/0285052 A1 Dec. 13, 2007

(30) Foreign Application Priority Data

Jun. 9, 2006 (KR) .................. 10-2006-0051954

(51) Int. Cl.
*H02J 7/00* (2006.01)
*H01M 6/46* (2006.01)

(52) U.S. Cl. ........ 320/106; 320/107; 320/110; 320/125; 320/138; 429/153; 429/156

(58) Field of Classification Search .................. 320/106, 320/107; 429/153
See application file for complete search history.

(56) References Cited

U.S. PATENT DOCUMENTS

| 4,443,523 | A | 4/1984 | Hasenauer |
| 6,372,377 | B1 * | 4/2002 | Ovshinsky et al. ............. 429/66 |
| 6,455,190 | B1 * | 9/2002 | Inoue et al. .................... 429/160 |
| 6,821,673 | B1 * | 11/2004 | Hamada et al. ............... 429/160 |
| 2003/0118898 | A1 * | 6/2003 | Kimura et al. ................ 429/156 |
| 2004/0229121 | A1 * | 11/2004 | Hamada et al. ............... 429/209 |
| 2005/0170240 | A1 | 8/2005 | German |
| 2006/0115720 | A1 | 6/2006 | Kim |

FOREIGN PATENT DOCUMENTS

KR 1020060037600 A 3/2006

OTHER PUBLICATIONS

Korean Office Action dated Sep. 25, 2009 corresponding to the Korean Patent Application No. 10-2006-0037600.
Korean notice of decision to grant a patent, dated Mar. 10, 2010, corresponding to Korean Patent Application No. 10-2006-0051954.

* cited by examiner

*Primary Examiner* — Edward Tso
*Assistant Examiner* — Yalkew Fantu
(74) *Attorney, Agent, or Firm* — Robert E. Bushnell, Esq.

(57) ABSTRACT

A battery module is constructed with a plurality of unit batteries, and barrier ribs including bands mounted on each of the unit batteries and forming gaps to enable a heat conductive medium to circulate the unit batteries.

20 Claims, 8 Drawing Sheets

BATTERY MODULE

CLAIM OF PRIORITY

This application makes reference to, incorporates the same herein, and claims all benefits accruing under 35 U.S.C. §119 from an application for SECONDARY BATTERY MODULE earlier filed in the Korean Intellectual Property Office on 9 Jun. 2006 and there duly assigned Serial No. 10-2006-0051954.

BACKGROUND OF THE INVENTION

1. Field of the Invention

The present invention relates to a battery module. More particularly, the present invention relates to a battery module in which a configuration of barrier ribs mounted between batteries is improved.

2. Description of the Related Art

Unlike a primary battery that is incapable of being recharged, a rechargeable battery may be repeatedly charged and discharged.

Rechargeable batteries are manufactured in various shapes, for example, a cylindrical shape or a prismatic shape.

Recently, high power secondary batteries using a non-aqueous electrolyte having a high energy density have been developed. A battery module is formed by coupling a plurality of high output secondary batteries (hereinafter, referred to as a "unit battery") in series so that the battery module will be able to drive a motor for an apparatus requiring high power (e.g., an electric vehicle).

When the unit battery is formed in a rectangular shape, the unit battery is typically constructed with a group of electrodes having anodes and cathodes, a case having a space in which the group of electrodes are arranged, a cap plate for closing and sealing the case, and anode and cathode terminals that protrude through the cap plate and are electrically connected to the group of electrodes.

Since the battery module may include several to several tens of unit batteries, the battery module is required to dissipate the heat generated from each unit battery.

Accordingly, contemporary battery modules are constructed with barrier ribs disposed between the unit batteries, to form gaps between the unit batteries in order to enable a coolant (i.e., a heat conductive medium) to flow around the unit batteries, and to support the unit batteries so that the arrangement of the unit batteries may not be changed.

When the battery module is constructed with the conventional barrier ribs, however, the configuration is complicated and a manufacturing cost is problematically increased due to an injection molding process.

Accordingly, it is currently required to provide barrier ribs that may be easily manufactured and assembled while having sufficient stiffness and efficiently for dissipating the heat.

The above information disclosed in this Background section is only for enhancement of an understanding of the background of the invention and therefore may contain information that does not form the prior art that is already known in this country to a person of ordinary skill in the art.

SUMMARY OF THE INVENTION

It is therefore an object of the present invention to provide an improved battery module.

It is another object to provide a battery module including barrier ribs having a simplified configuration that facilitates manufacture.

It is still another object to provide a battery module including barrier ribs having excellent mechanical strength.

A battery module according to an exemplary embodiment of the present invention includes a plurality of unit batteries and barrier ribs. The barrier ribs include bands mounted on the respective unit batteries and form paths accommodating flow of a heat conductive medium through the unit batteries.

The unit batteries may be arranged in series while having gaps therebetween, and the bands may be aligned to interlock between the unit batteries.

The bands may be provided to the unit batteries while leaving predetermined intervals therebetween, and the bands provided respectively to even or odd numbered unit batteries may be disposed in the same position.

Each of the bands may form a plane that lies parallel with an upper surface of a case of the unit batteries.

The bands may be hollow.

Alternatively, the bands may be solid.

A cross-section of the bands may be formed in a circular or polygonal shape.

The bands may be attached to the case of the unit batteries in a welding process.

The bands may be fitted to the case of the unit batteries in a tight fitting method.

The barrier ribs may further include supporting portions that cross the bands and are connected to the bands to provide support thereto.

The supporting portions may be attached to an area that does not interfere with the paths of the heat conductive medium flowing through the unit batteries.

The supporting portions may be formed in a panel shape.

The unit batteries may be formed in a prismatic shape.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
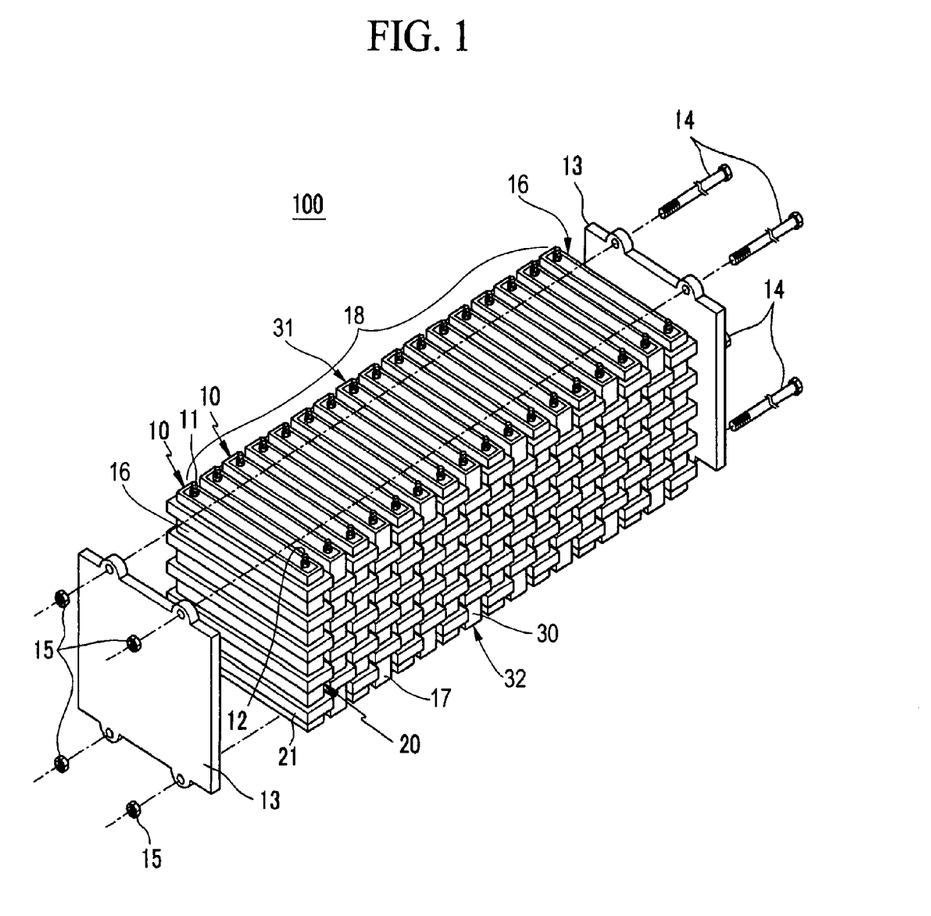
FIG. 1 is an orthogonal view of a battery module constructed as an exemplary embodiment according to the principles of the present invention.

Referring to FIG. 1, battery module 100 is constructed according to the principles of the present exemplary embodiment with a plurality of unit batteries 10, and barrier ribs 20. Each unit battery of the plurality of unit batteries 10 is constructed with an electrode group including anodes and cathodes, and is constructed with separators disposed between the anodes and the cathodes. Unit batteries 10 are repeatedly charged and discharged. Barrier ribs 20 maintain gaps between unit batteries 10 to enable a heat conductive medium to flow around unit batteries 10.

Hereinafter, unit batteries 10 constructed according to the exemplary embodiments of the present invention will be described while assuming that unit batteries 10 are formed in a prismatic shape. External terminals including an anode terminal 11 and a cathode terminal 12 are protruded on an upper surface of each unit battery 10. While it is not described, neighboring unit batteries 10 are connected in series through electrical conductors (not shown).

According to the present exemplary embodiment, a plurality of unit batteries 10 are sequentially arranged while having gaps therebetween, and the gaps are maintained by barrier ribs 20 disposed between unit batteries 10, and therefore a battery set 18 is formed.

Battery set 18 is fastened together by pressing a pair of end plates 13 with a certain pressure onto outmost surfaces 16 of the first and last unit batteries 10 of battery set 18, and fixing end plates 13 with battery set 18 by connection rods 14 and nuts 15.

Battery set 18 may be disposed in a housing (not shown) constructed with an inlet (not shown) and an outlet (not shown) of the heat conductive medium. The heat conductive medium received through the inlet of the housing circulates between unit batteries 10 to dissipate the heat, and the heat conductive medium having exchanged the heat is output through the outlet of the housing.

Here, configurations of the housing and the battery set with respect to the housing are not limited as above, and they may vary within a rage in which the heat conductive medium may be input and output.

Figure 2:
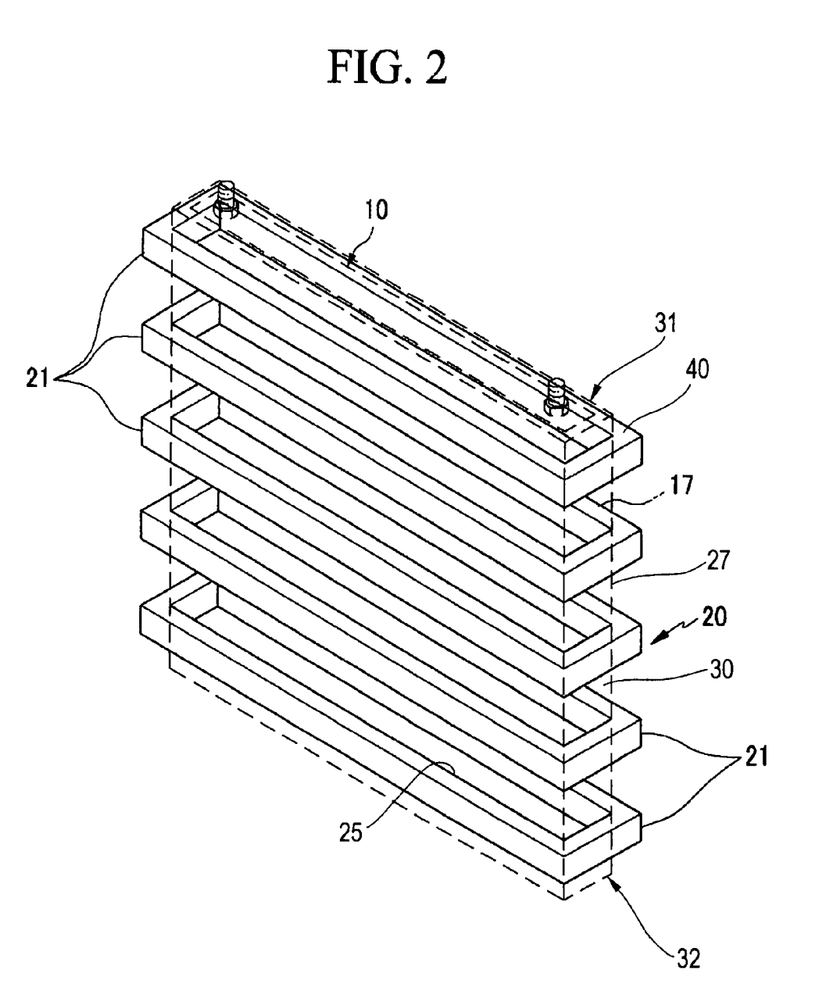
FIG. 2 is an oblique view of barrier ribs of the battery module constructed according to a first exemplary embodiment of the principles of the present invention.

Barrier ribs 20 according to a first embodiment of the principles of the present invention include a plurality of bands 21 having a closed, rectangular shape as shown in FIG. 2. Each band 21 is respectively disposed around side walls 30 of a unit battery 10.

For each unit battery, there is at least one band 21 disposed around side walls 30 of unit battery 10. Each band 21 forms a corresponding plane that lies parallel with case 17 of unit battery 10. That is, the corresponding plane 40 of each band 21 are mounted to be parallel with an upper surface 31 (or a lower surface 32) of case 17.

Bands 21 are separately provided from unit batteries 10, and unit batteries 10 may be simply inserted into respective bands 21, or alternatively, bands 21 may be assembled in a welding process.

For each unit battery 10, according to the first embodiment of the present invention, bands 21 may be wound around side walls 30 of unit battery 10, while spaced apart from each other.

In the exemplary embodiment of the present invention, to assure a tight fit between bands 21 and unit batteries 10, an inner circumference 25 of bands 21 is formed to be smaller than an outer circumference 27 around side walls 30 of cases 17 of unit batteries 10.

In addition, bands 21 may be made from an aluminum material, a copper material, or an iron material having excellent thermal conductivity, and are forced fit around side walls 30.

Alternatively, band 21 may be made from a rubber material, or a synthetic resin material having sufficient elasticity.

Here, the intervals between bands 21 are not limited, and they may vary according to the characteristics of battery module 100. For example, when the intervals between bands 21 are wide, the space for the heat conductive medium to flow between the bands may be increased. On the other hand, when the intervals between bands 21 are narrow, the intensity of barrier ribs 20 may be increased.

Figure 3:
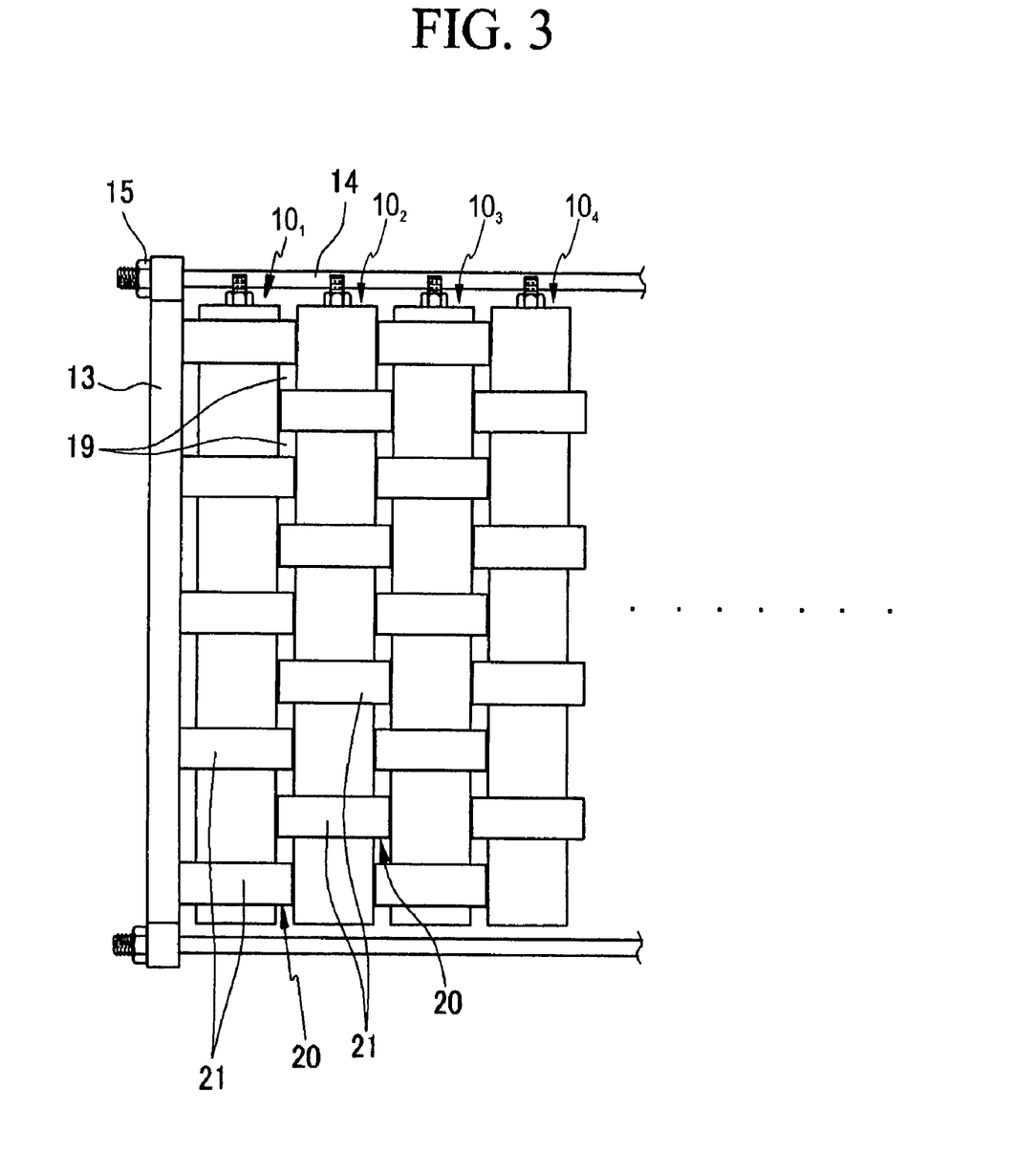
FIG. 3 is an elevation view of a side of the battery module constructed according to the exemplary embodiment of the principles the present invention.

As shown in FIG. 3, bands 21 according to the exemplary embodiment of the present invention are aligned to interlock and mesh with each other between the neighboring unit batteries 10. That is, bands 21 disposed on the odd numbered unit batteries 10 (referred to individually as $10_1$, $10_3$ . . . ) are disposed in one position, and bands 21 disposed on the even numbered unit batteries 10 (referred to individually as $10_2$, $10_4$ . . . ) are disposed in a different position.

That is, bands 21 disposed on the odd numbered unit batteries 10 are positioned in an offset between bands 21 in a sequentially staggered configuration disposed on the even numbered unit batteries 10 to form a meshed, or interlocked serially aligned array.

Accordingly, spaces 19 between two neighboring unit batteries (i.e., between bands 21 disposed on two neighboring unit batteries 10) form paths for the heat conductive medium that is input to the housing and passes to flow through battery module 100.

Figure 4:
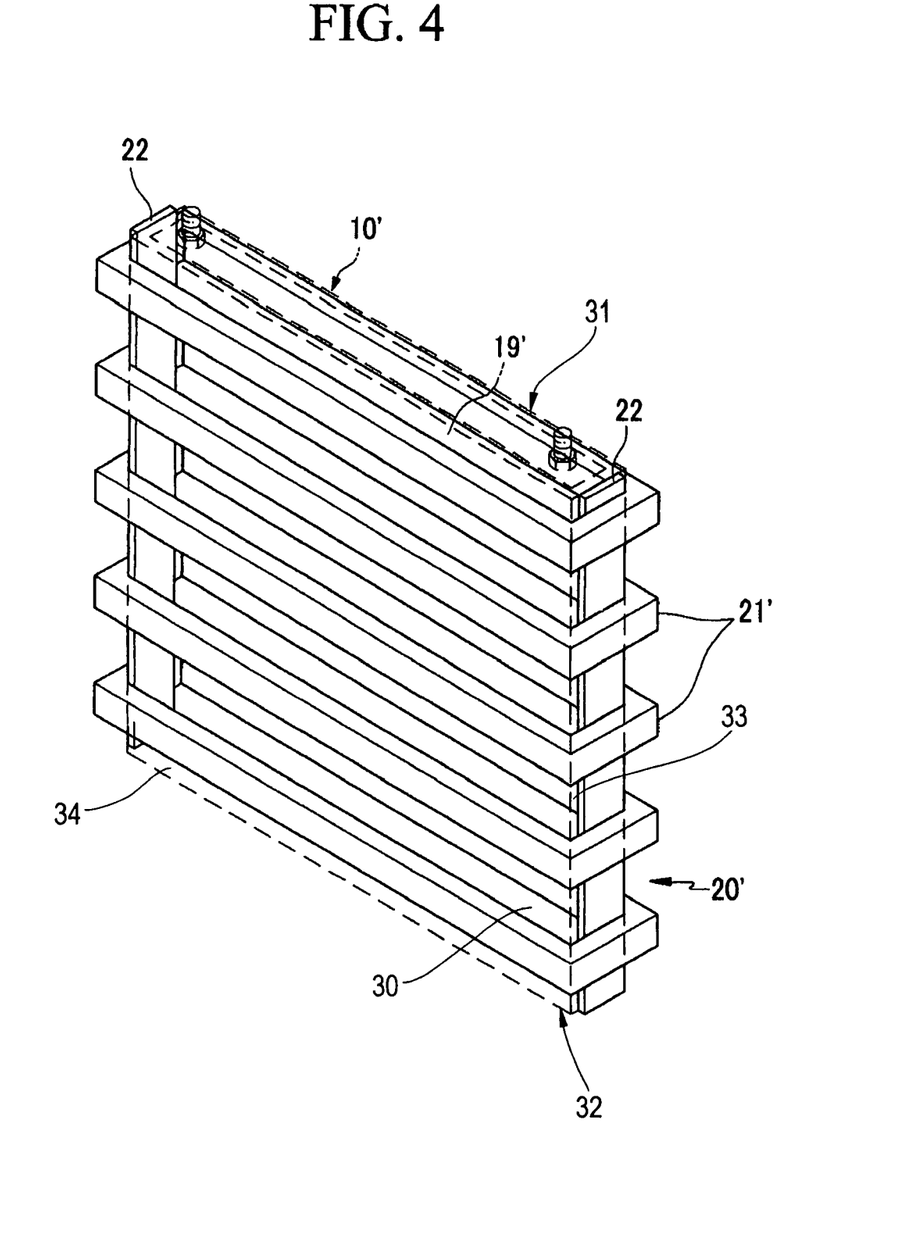
FIG. 4 is an orthogonal view of barrier ribs of the battery module constructed according to a second exemplary embodiment of the principles of the present invention.

According to a second exemplary embodiment of the principles of the present invention, as shown in FIG. 4, barrier ribs 20' are constructed with a plurality of bands 21' surrounding side walls 30 of cases 19 of unit batteries 10', and supporting portions 22 connected to respective bands 21' and supporting respective bands 21'. Supporting portions 22 are formed in a panel shape.

Accordingly, the intervals and the shape of bands 21' may be maintained by supporting portions 22.

Here, supporting portions 22 are positioned on side walls 33 having less contact with the heat conducting medium (i.e., side walls 33 having smaller surface area, as shown in FIG. 4).

That is, since in the exemplary embodiment of the present invention, the heat conductive medium contacts side walls 34 of unit batteries 10' with larger surface area more than side walls 33 of unit batteries 10' with smaller surface area, supporting portions 22 are positioned on said walls 33 of unit batteries 10' to be attached to bands 21'.

Accordingly, the heat conductive medium does not interfere with supporting portions 22 so that the heat conductive medium may circulate without any interruption.

Here, supporting portions 22 may be connected to bands 21' on both side walls 33 of unit batteries 10' facing each other, or may be mounted on one of side walls 33 of unit batteries 10'.

Further, supporting portions 22 may be made from the same material as bands 21'.

In addition, supporting portions 22 may be mounted on an outer surface of bands 21' or on an inner surface of bands 21'.

Figure 5:
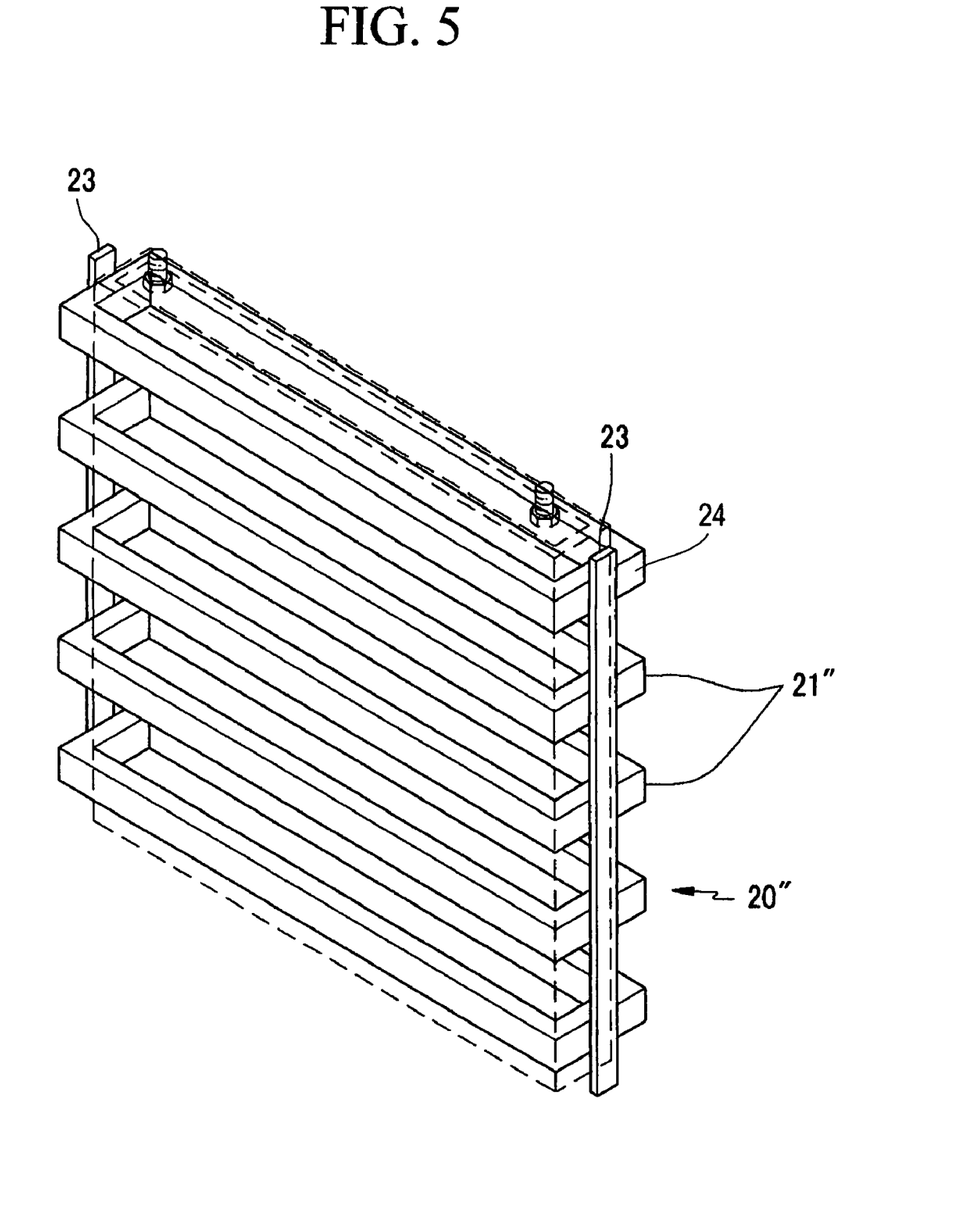
FIG. 5 is an oblique view of barrier ribs of the battery module constructed according to a third exemplary embodiment of the principles of the present invention.
Figure 6:
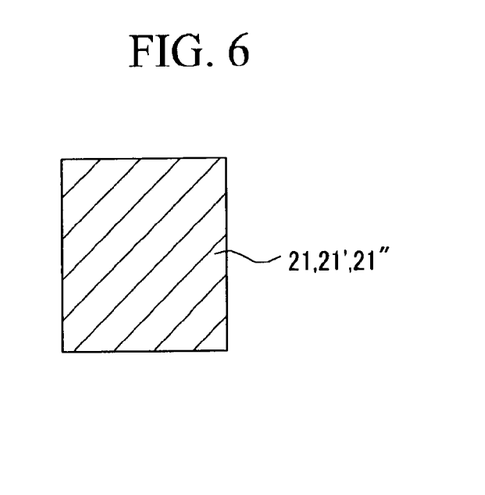
FIG. 6 to FIG. 13 are alternative cross-sectional views of the barrier ribs that may be constructed as the exemplary embodiments of the principles of the present invention.
Figure 7:
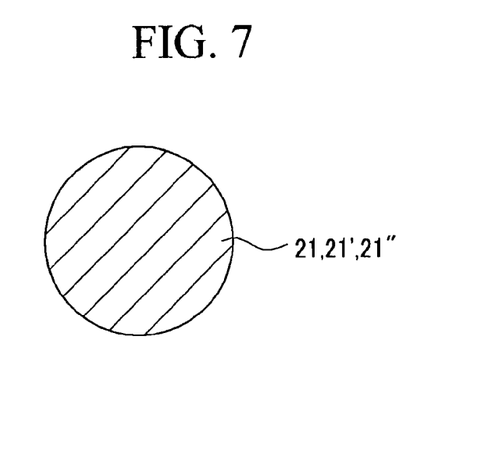
Figure 8:
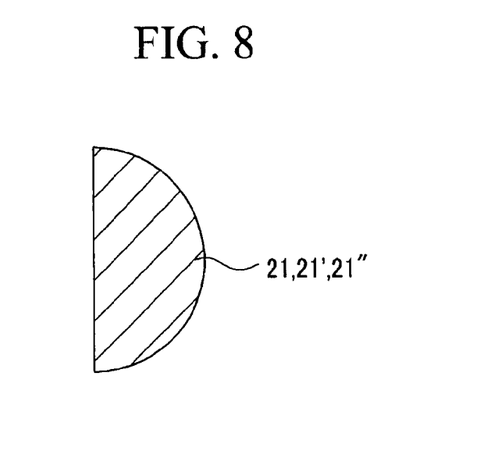
Figure 9:
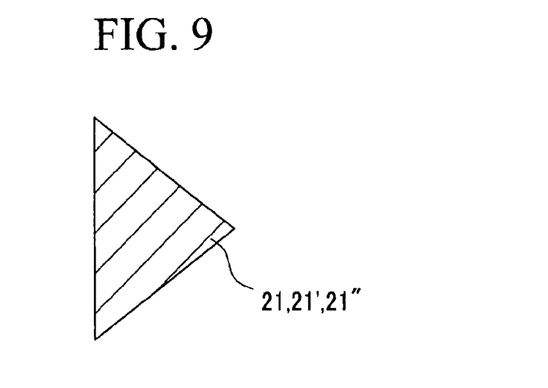
Figure 10:
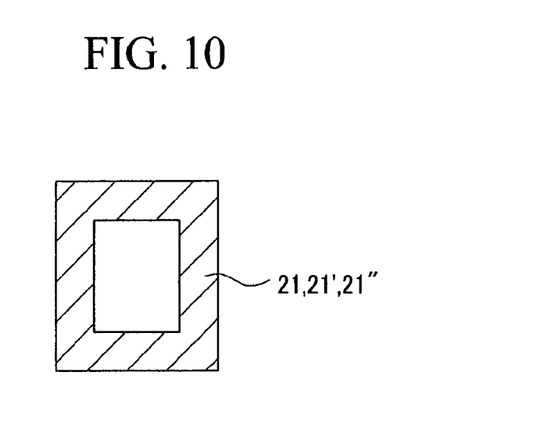
Figure 11:
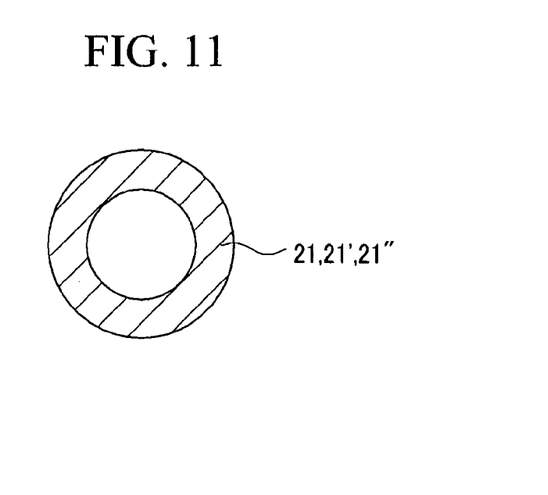
Figure 12:
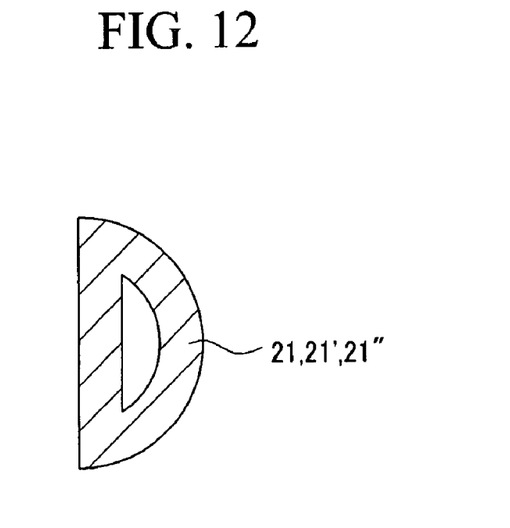
Figure 13:
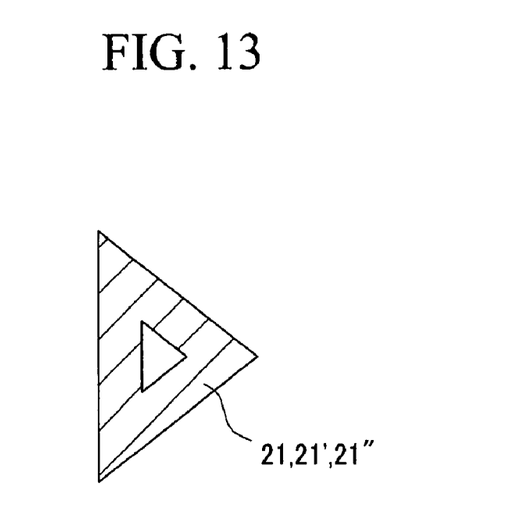

FIG. 5 is a diagram of a configuration in which supporting portions 23 are mounted on an outer surface of bands 21" according to a third exemplary embodiment of the principles of the present invention. Here, differing from supporting portions 22 shown in FIG. 4, supporting portions 23 are formed in a bar shape.

Since a function of supporting portions 23 is the same as that of supporting portions 22 shown in FIG. 4, except for a mounting position thereof, a detailed description of the function thereof will be omitted.

As described, if the bands and the supporting portions are provided in the configuration of the barrier ribs, the unit batteries may be easily fixed, and the shape of the unit batteries may be well maintained.

In addition, the cross-sectional shape of bands 21, 21', and 21" is not limited to a predetermined shape, and may be formed in a rectangular shape, a circular shape, a semicircular shape, or a triangular shape in which the inside thereof is solid, as shown respectively in FIG. 6 to FIG. 9.

Further, the cross-sectional shape of bands 21,21', and 21" may be formed in a rectangular shape, a circular shape, a semicircular shape, or a triangular shape in which the inside thereof is empty, as shown respectively in FIG. 10 to FIG. 13.

As described, the barrier ribs may be easily manufactured by simply winding the bands around the outer surfaces of the cases of the unit batteries. The barrier ribs separate the unit batteries and maintain the gaps between the unit batteries, and the heat conductive medium may efficiently flow through the gaps.

In this case, since the bands and the unit batteries contact each other in a narrow line when the cross-section of the bands is formed in a circular shape, an area in which the unit batteries contacts the heat conductive medium is maximized, and heat conducting efficiency may be further improved.

The battery module according to the exemplary embodiment of the present invention may be used as an energy source for driving motors of a hybrid electric vehicle (HEV), an electric vehicle (EV), a cordless cleaner, a motorbike, and an electric scooter.

In addition, according to the exemplary embodiment of the present invention, since the configuration of the barrier ribs is simplified and the barrier ribs are easily manufactured, productivity of the battery module may be increased, and a manufacturing cost thereof may be reduced. Further, mechanical strength may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module, comprising: a plurality of unit batteries; and a plurality of barrier ribs comprising bands, external peripheries of each one of the plurality of unit batteries being surrounded by at least one band to form paths accommodating flow of a heat conductive medium between the unit batteries to enable the plurality of unit batteries to be uniformly aligned in a row forming the battery module; and a tight fits between bands and unit batteries, an inner circumference of bands is smaller than an outer circumference around side walls of cases of unit batteries; and unit batteries being arranged in serial alignment, and the at least one band of a first unit battery and the at least one band of a second and immediately adjacent unit battery being sequentially staggered to mesh with each other.

2. The battery module of claim 1, with the unit batteries being arranged in serial alignment, and the at least one band of a first unit battery and the at least one band of a second and immediately adjacent unit battery being sequentially staggered to mesh with each other.

3. The battery module of claim 2, with the plurality of unit batteries comprising even numbered unit batteries and odd numbered unit batteries, the even numbered unit batteries being disposed adjacent to the odd numbered unit batteries, and with the bands mounted on the even numbered unit batteries being disposed in first positions while the bands mounted on the odd numbered unit batteries being disposed in different positions offset from the first positions.

4. The battery module of claim 3, with the bands mounted on the even numbered unit batteries being disposed between the bands mounted on the odd numbered unit batteries.

5. The battery module of claim 1, with each one of the bands forming a corresponding plane that lies parallel to an upper surface of cases of the unit batteries.

6. The battery module of claim 1, with the at least one band mounted on a first unit battery being spaced apart from the at least one band mounted on a second and immediately adjacent unit battery.

7. The battery module of claim 1, with the bands being hollow.

8. The battery module of claim 1, with the bands being solid.

9. The battery module of claim 1, with a cross-section of the bands being formed in a circular or polygonal shape.

10. The battery module of claim 1, with the bands being attached to cases of the unit batteries by a welding process.

11. The battery module of claim 1, with the bands being fitted to cases of the unit batteries in a tight fitting method.

12. The battery module of claim 11, with an inner circumference of the bands being smaller than an outer circumference of cases of the unit batteries.

13. The battery module of claim 1, with the barrier ribs further comprising supporting portions that attach to the bands to provide support to the bands.

14. The battery module of claim 13, with the supporting portions being attached to an area that does not interfere with flow paths of the heat conductive medium through the unit batteries.

15. The battery module of claim 13, with the supporting portions being formed in a panel shape.

16. The battery module of claim 13, with the supporting portions being formed in a bar shape.

17. The battery module of claim 1, with the unit batteries being formed in a prismatic shape.

18. A battery module, comprising: a plurality of unit batteries; and a plurality of ribs comprising bands, at least one band mounted to surround side walls of a corresponding one of the plurality of unit batteries, with the thickness of the band defining gaps between the corresponding one of the unit batteries and the neighboring unit batteries, and a tight fits between bands and unit batteries, an inner circumference of bands is smaller than an outer circumference around side walls of cases of unit batteries; and bands mounted on neighboring unit batteries being sequentially staggered to mesh with bands on the corresponding one of the unit batteries.

19. The battery module of claim 18, with, when each unit battery having more than one bands, the bands mounted on a first unit battery and the bands mounted on a second and immediately adjacent unit battery being spaced apart from each other.

20. The battery module of claim 18, with the barrier ribs further comprising supporting portions for each unit battery that attach to the bands mounted on the unit battery to provide support to the bands.

* * * * *